United States Patent Office 2,892,283
Patented June 30, 1959

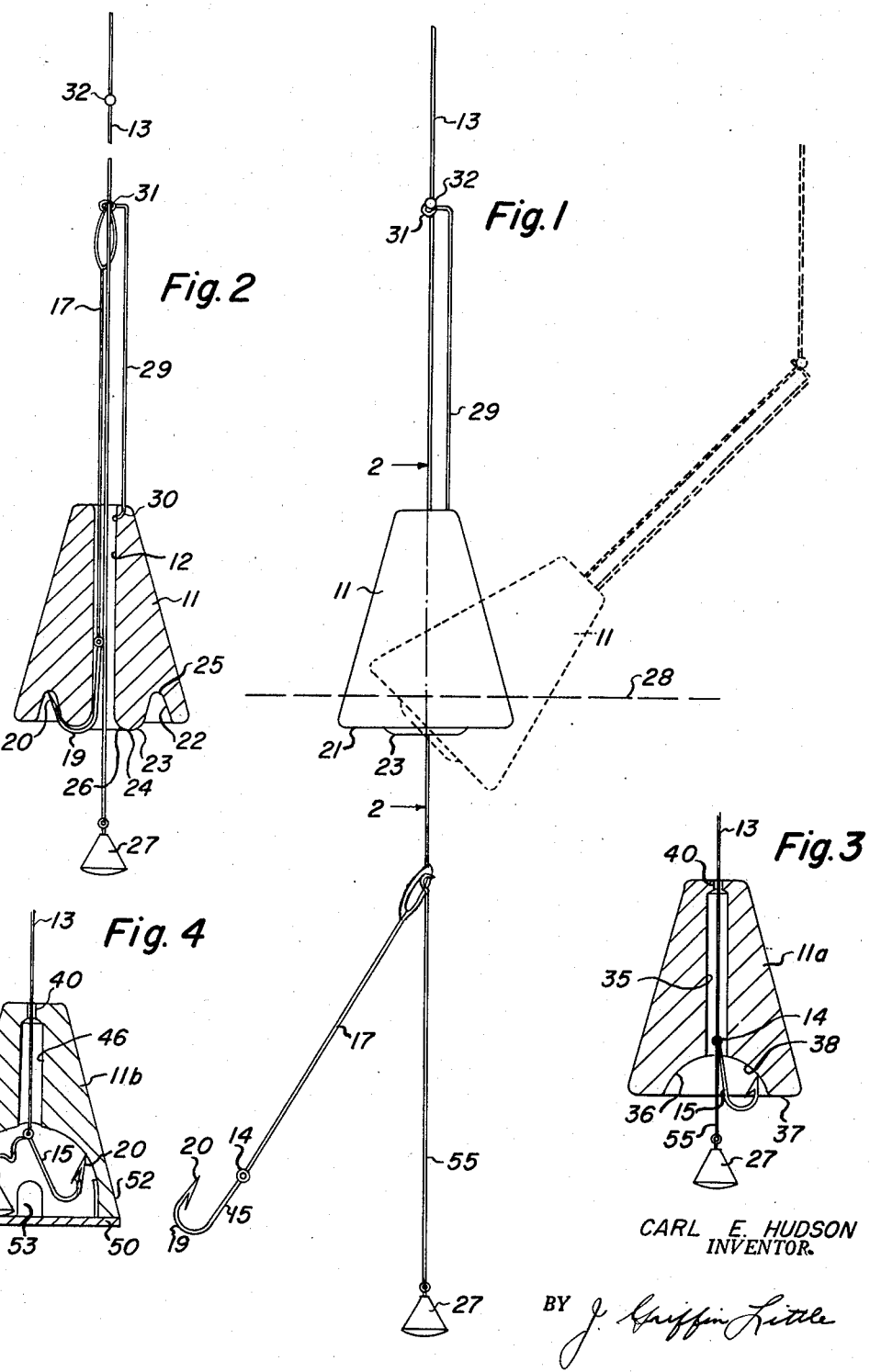

2,892,283
SAFETY BOBBER FOR FISH LINE
Carl E. Hudson, Rochester, N.Y.
Application August 8, 1956, Serial No. 602,701
2 Claims. (Cl. 43—43.4)

The present invention relates to a fishing device, and more particularly to a hook-protecting bobber or floater.

As is well known, in certain types of fishing, a bobber or floater is attached to the fish line, the bobber floating on the surface of the water. When a strike occurs the pull on the line jerks the bobber to displace the latter, or even pull it under the water surface to indicate to the fisherman that he has a strike. When the line is pulled in, if there is no fish on the hook, the latter is exposed, the disadvantages of which are dangerous, as is well known.

The present invention provides a bobber which not only indicates to the fisherman when a strike occurs; but when the line is reeled in, the hook is drawn into and in protective relation within the bobber body, as is to be later more fully described. When the term "reel in" is used in the specification and claims, it refers to the drawing in of the fish line either by means of a reel or manually so that the bobber is positioned adjacent the fisherman or to the pole, if the latter is used.

The present invention has its principal object the provision of a bobber which is adapted to receive a hook in an enclosed protected relation within the bobber.

Another object of the invention is the provision of a bobber which cooperates with the line to position the hook a definite distance below the bobber.

A further object of the invention is the provision of a bobber which is so constructed that, when the line is reeled in, the hook will engage and cooperate with the bobber so the latter and the hook may be moved as a unit, and with the hook in an enclosed and protected relation within the bobber.

Still another object of the invention is the provision of a closure member for the bobber to retain the hook in an enclosed and protected relation within the bobber.

Yet another object of the invention is the providing of a bobber with a guiding surface which will guide the hook into proper protected relation within the bobber.

To these and other objects the invention resides in certain improvements and combinations of parts all as will be hereinafter more fully described, the novel features being pointed out in the claims at the end of the specification.

In the drawings:

Fig. 1 is a side elevation view of the bobber, showing the relation thereof to the line and hook, the latter being shown in the solid-lines in the position when the bobber first strikes the water; and in the dotted-lines the position the bobber assumes during normal fishing operations;

Fig. 2 is a vertical sectional view through the bobber illustrated in Fig. 1, and taken substantially on line 2—2 thereof, but with the hook in its retracted relation and positioned within the bobber;

Fig. 3 is a view similar to Fig. 2, but showing a slightly modified form of bobber with the hook in its retracted position in the bobber; and Fig. 4 is a view similar to Figs. 2 and 3 showing still another modification of the bobber and with the hook, line and sinker retracted within the bobber, and a closure means for closing the lower end of the bobber.

Similar reference numerals throughout the various views indicate the same parts.

The drawings show a bobber 11 made of any suitable buoyant material such as wood or cork. In the present instance the bobber is shown as frusto-conical in shape, but this is by way of illustration only and is not intended as a limitation. On the contrary, the bobber may be of any suitable shape such as cylindrical, cubical, spherical or any other desired configuration. The only requirement is that the bobber must be of such length as to receive the hook as shown in Fig. 2. Otherwise there are no other size or shape limitations.

The bobber 11 is formed with a central axial or longitudinal passage 12 through which the fish line 13 extends. The passage 12 is of such diameter or cross-sectional area as to permit the line 13 to slide freely therethrough. The lower end of the line 13 may be secured directly to the eye 14 of the shank 15 of the hook as illustrated in Fig. 4, or the eye may be connected to one end of a leader 17. The other end of the leader may be securely attached to the line 13 as shown in Fig. 1. If such a leader 17 is used, obviously the passage 12 should be of such size as to permit the free passage of the combined line and leader.

In all embodiments, the bottom of the bobber is provided with a recess in which the lower loop portion 19 and the barbed end 20 of the hook are received in position in an enclosed protected relation when the leader and line are fully reeled in, as shown in Figs. 2–4.

In the embodiments shown in Figs. 1 and 2, the passage 12 extends completely through the bobber. In addition, the bottom surface 21 of the bobber is formed with an annular recess 22 which surrounds the passage 12. This recess 22 forms an annular depending rim or lip 23, the lower surface of which has a curvature which is substantially that of the portion 19 of the hook, as shown in Fig. 2. With this arrangement, when the line 13 is fully pulled in, the loop portion 19 of the hook will engage the surface 24 of the rim 23, while the barbed end 20 of the hook will be positioned within the recess 22 with the point of the hook arranged adjacent the bottom 25 of the recess. If desired, the depth of the recess 22 may be such that when the hook is positioned as shown in Fig. 2, the sharp end of the hook is positioned slightly away from the bottom 25 of the recess so the sharp end will not dig into the bottom, the advantages of which are deemed apparent.

In addition to affording a protective enclosure for the hook, the recess 22 and the rim 23 provide means by which the loop portion of the hook can engage the bobber to connect the hook to the bobber for unitary movement thereof. It will be apparent from an inspection of Fig. 2, that when line 13 is fully reeled in the hook will be in the position shown in Fig. 2 and the loop portion 19 of the hook will engage surface 24 to connect the hook to the bobber so that any further reeling in will lift the bobber as a unit with the hook. Thus, when the hook is pulled out of the water, it will be in enclosed and protected relation within the bobber and will always move as a unit therewith, the advantages of which are deemed apparent.

The position of the bobber on the water surface 28 will will depend somewhat upon the shape of the bobber. With a bobber as shown in Figs. 1 and 2, the bobber when striking the water will be in the position indicated in the full lines, Fig. 1, but in normal operation the bobber will lie in inclined relation to the water surface as shown in the dotted lines, Fig. 1. In this inclined position the portion of the fish line below the bobber is out of alignment with the passage 12, as is deemed apparent. In order properly to position the hook within the bobber when the line is reeled in, it is necessary that the shank 15 of the hook be drawn up and positioned in the passage 12. However, because the portion of the line below the bobber is out of alignment with the passage 12, means is provided to guide the hook shank 15 into the passage 12 as the line 13 is reeled in.

To this end, the lower end of passage 12 in the rim 23 is curved upward to form a cam or guiding surface 26 which will be engaged first by the hookeye 14 and then by the shank 15 as the line is reeled in. This cam or guide surface 26 gradually guides and/or directs the shank and eye freely and smoothly into the passage 12 to position the hook in a protected relation within the bobber in the relation shown in Fig. 2.

The fisherman usually desires to position the hook, as well as the sinker 27, attached to the lower end of line 13, a definite distance below the bobber and the water surface 28. To secure this result, the invention provides means for limiting the downward movement of the line relative to the bobber. To secure this result, a stop member carried by or attached to the bobber cooperates with a member or portion of the line to limit such downward movement to position the hook a definite or predetermined distance below the water surface 28.

This stop means may comprise a thin wire or other suitable member 29, the lower end 30 of which is suitably anchored to the bobber as shown in Fig. 2. This member 29 extends upwardly from the bobber and has formed on the upper end thereof, a small loop or eye 31, of sufficient size to permit the free passage of the line 13 therethrough. The latter may, on the other hand, be provided with a cooperating stop member 32, which is of such size as not to pass through the loop 31. The result is that when the line is led out, the line passes freely through the loop 31 and passage 12 until the member 32 finally engages the loop 31 which limits further movement of the line, and thus accurately positions the hook a definite distance below or away from the bobber 11 and the water surface 28. The stop member 32 may be of any suitable construction and may consist merely of a knot or loop in the line 13. On the other hand, the stop member 32 may be in the form of a split shot slidably connected to the line so the shot may be slid along the line to vary the position thereof on the line. As the stop member 32 may be of any suitable construction or design, and does not, per se, form a part of the present invention, further details thereof are not deemed necessary. In place of the member 29 with its loop 31, a small tubular member may be attached to the top of the bobber with the opening in the tubular member in alignment with the opening 12, the opening of the tubular member being of a size to permit the line 13 to pass freely therethrough but to prevent passage of the stop member 32.

If the leader 17 is used, as shown in Figs. 1 and 2, the loop 31 of stop member 29 should be positioned a sufficient distance above the bobber so that when the connection of the leader to the line engages the loop 31, the hook will be properly positioned, as shown in Fig. 2. Thus, the loop 31 of the stop member 29 also serves to insure proper positioning of the hook in the recess 22.

Fig. 3 is a slight variation of the Figs. 1 and 2 in that the central passage 35 terminates short of the bottom of the bobber and communicates with a recess 36 formed in the bottom surface 37 of the bobber 11a. Thus, the passage 35 and recess 36 form a continuous opening. When the line is completely reeled in, the loop portion 19 and the barbed end 20 will be positioned completely within the recess 36, as shown in Fig. 3. In this embodiment, the hookeye 14 is connected directly to the line 13 and no leader is used. The recess 36 may be of any suitable depth so long as the barbed end 20 is completely within and in protected relation in the recess 36. If desired, the recess may be of such depth also as to receive completely the loop portion 19 but this is not necessary. As the line is reeled in the barbed end 20 will be drawn in the recess 36 and will finally engage the bottom 38 thereof, as shown in Fig. 3. Such engagement serves to connect the hook and bobber so the two elements may be moved as a unit.

Fig. 3 also shows another difference over the bobber illustrated in Figs. 1 and 2, in that the looped stop member 29 is omitted and in its place the upper end of passage 35 is reduced in size to provide a smaller aperture 40 which is of sufficient size as to allow the free movement of the line 13 therethrough but will not permit passage of the stop member 32. Thus, this aperture 40 will cooperate with the stop member on the line to limit the amount of line positioned below the bobber to position the hook a definite distance below the water surface. Thus, the bobber of Fig. 3 serves to position the hook the proper distance below the bobber yet retains the hook in a protected relation when the line is fully reeled in. Also, when the line is fully reeled in the hook will be positioned in and will engage the bottom 38 of the recess 36 to connect the hook to the bobber for unitary movement therewith. The result is that whenever the hook is out of the water, the bobber and hook will move as a unit and the hook will be positioned in protected relation with the recess 36.

Fig. 4 shows another modification which is similar to that illustrated in Fig. 3, but differs therefrom in that the recess 45 of the bobber 11b is slightly deeper than the recess 36 of Fig. 3, parts corresponding to Figs. 1–3 are designated by the same numerals. In this embodiment the bobber is shown with the reduced opening 40 but it is apparent that the leader arrangement and stop structure illustrated in Fig. 2 may be used, if desired. In the embodiment of Fig. 4 the hook is drawn further into the recess than in Fig. 3 because the recess 45 is of greater depth than the recess 36.

Thus, in all the embodiments, the depth or distance of the hook below the bobber is controlled to position the hook a definite and predetermined distance from the bobber of the water surface. Also, when the line is reeled in, the hook is retracted or withdrawn into a recess formed in the bottom of the bobber and is, therefore, protected by the bobber when the hook is out of the water. In addition, when the bobber is out of the water, the hook is connected thereto in an enclosed and protected relation for unitary movement with the bobber. Thus, the hook and bobber may be moved as a unit for casting, the advantages of which are deemed apparent. In the embodiments illustrated in Figs. 1 and 2, the loop end 19 of the hook engages the bobber to connect the hook thereto, while in the embodiment of Figs. 3 and 4, the barbed end 20 is utilized to connect the hook and bobber.

It is apparent from the above description that when the line is reeled or drawn in, the hook is retracted into position and protected relation with the bobber. Whenever the pull on the line is relaxed, it is apparent that the sinker will withdraw the hook out of its protected relation in the recess and place the hook in a dangerous position when it may snag the operator or his clothing. To overcome this disadvantage, the present invention provides a suitably shaped enclosed cap 50 which overlies the surface 51 of the bobber as shown in Fig. 4. While this closure is shown only in connection with the bobber of Fig. 4, it is apparent and is intended it can be used, with possibly slight modification, with any of the bobbers shown. Any suitable arrangement can be used for securing the closure cap to the bobber. For example, the cap may have a depending skirt which slides over and frictionally engages the outer surface of the bobber 11. Also, if the side walls of the bobber recess are parallel a threaded engagement may be employed to secure the cap in place. In the embodiment of Fig. 4, the cap is formed with a plurality of, in the present instance three, upwardly extending spring fingers 53 which engage frictionally the wall 54 of the recess to retain the cap 50 in recess-closing position, as is deemed apparent in Fig. 4. It is apparent that before the cap is applied, the hook, as well as the portion 55 of the line 13 between the hook and the sinker 27 should be placed in the recess after which the cap is applied as shown in Fig. 4. On the other hand, the line may be detached from the hook and the latter only held in protected relation in the recess by the closure cap.

Thus, the present invention provides a bobber which positions the hook in protected and enclosed position within the bobber when the latter is lifted out of the water, connects the hook to the bobber when the latter is out of the water so that the hook and bobber may be moved as a unit, positions the hook automatically a predetermined distance below or from the bobber. In addition, a closure member is provided to retain the hook or the hook and the lower portion of the line within a bobber recess so that the bobber and hook may be handled safely as a unit for storage, shipping or handling.

While one embodiment of the invention has been disclosed, it is to be understood that the inventive idea may be carried out in a number of ways. Therefore, this application is not to be limited to the precise details described, but is intended to cover all variations and modifications thereof which fall within the scope of the appended claims.

What I claim and desire to secure by Letters Patent of the United States is:

1. A bobber for use with a fish line to which a fish hook is secured adjacent the lower end thereof, said hook comprising a shank which is secured to said line and which terminates in a lower loop portion the free end of which forms the hook section, said bobber comprising a body portion of buoyant material formed with a passage extending longitudinally therethrough and through which said line is slidable freely, means secured to and extending above said body engageable by a part of said line to limit the downward movement of said line relative to said bobber to position said hook a predetermined distance below said bobber, said body having a recess at the bottom thereof in which the loop portion is drawn when said line is fully reeled in so that said hook section is positioned completely and in a protected relation within said recess, means on said body portion for guiding said shank into said passage as said loop portion is drawn into said recess, and means on said body portion engaged by said loop portion when the latter is drawn into said recess to connect said bobber to said hook for unitary movement therewith.

2. A bobber for use with a fish line to which a fish hook is secured adjacent the lower end thereof, said bobber comprising a body of buoyant material formed with a passage extending longitudinally completely through said body and through which said line is freely movable, means on said body cooperating with an enlarged area on said line for limiting the downward movement of said line relative to said body to position said hook a predetermined distance below said body, said body having an annular recess in the bottom thereof, an annular rim in said recess surrounding said passage, said recess receiving the hook section of said fish hook when the line is completely reeled in to position said hook section completely within and in a protected relation in said recess, means on said rim for guiding the shank into said passage as said hook section is drawn into said recess, and means on said body engaged by said loop section as the latter is drawn into said recess to connect said hook and line to said body for unitary movement therewith.

References Cited in the file of this patent

UNITED STATES PATENTS

| | | |
|---|---|---|
| 1,689,027 | Helle | Oct. 23, 1928 |
| 2,014,517 | Beregow | Sept. 17, 1935 |
| 2,292,743 | Cordry | Aug. 11, 1942 |
| 2,475,736 | Burrous | July 12, 1949 |
| 2,498,815 | McVay | Feb. 28, 1950 |
| 2,685,756 | Mowbray | Aug. 10, 1954 |
| 2,700,842 | Lehmann | Feb. 1, 1955 |
| 2,768,464 | Volz | Oct. 30, 1956 |

FOREIGN PATENTS

| | | |
|---|---|---|
| 1,101,282 | France | Apr. 20, 1955 |